(12) United States Patent
Lo et al.

(10) Patent No.: US 11,006,011 B2
(45) Date of Patent: May 11, 2021

(54) CONDITIONER MODULES WITH CALENDER ROLLERS

(71) Applicant: Hewlett-Packard Development Company, L.P., Spring, TX (US)

(72) Inventors: Kevin Lo, Vancouver, WA (US); Jeffrey G Bingham, Vancouver, WA (US); Bradley B Branham, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/609,538

(22) PCT Filed: May 1, 2017

(86) PCT No.: PCT/US2017/030468
§ 371 (c)(1),
(2) Date: Oct. 30, 2019

(87) PCT Pub. No.: WO2018/203878
PCT Pub. Date: Nov. 8, 2018

(65) Prior Publication Data
US 2020/0076973 A1    Mar. 5, 2020

(51) Int. Cl.
*H04N 1/00* (2006.01)
*B29B 7/68* (2006.01)
*G03G 15/00* (2006.01)

(52) U.S. Cl.
CPC ..... *H04N 1/00602* (2013.01); *G03G 15/6555* (2013.01); *H04N 1/0062* (2013.01);
(Continued)

(58) Field of Classification Search
CPC .............. B65H 43/00; B65H 45/148; B65H 2404/1114; B65H 2220/02; B65H 2403/41; B65H 2511/416; B65H 2515/312; B65H 2557/64; B65H 2801/06; B65H 31/26; B65H 31/3081; B65H 7/02; B65H 7/20;
(Continued)

(56) References Cited

U.S. PATENT DOCUMENTS

| 2,931,113 A | 4/1960 | Stewart |
| 3,391,427 A | 7/1968 | James |

(Continued)

FOREIGN PATENT DOCUMENTS

| CN | 203510807 U | 4/2014 |
| EP | 1137543 | 10/2001 |

(Continued)

OTHER PUBLICATIONS

Smoothing Calender Vario G 168, http://plastima.nl/media/—8 pages.

*Primary Examiner* — Negussie Worku
(74) *Attorney, Agent, or Firm* — HP Inc. Patent Department

(57) ABSTRACT

In an example, a conditioner module may include a bridge to receive media from a media path of an imaging device and to deliver the media to a media input of a finisher module. The conditioner module may include a calender nip disposed at an output end of the bridge. The calender nip may compress the media and may feed the media into the media input of the finisher module.

15 Claims, 3 Drawing Sheets

(52) U.S. Cl.
CPC ..... *H04N 1/00591* (2013.01); *H04N 1/00615* (2013.01); *B29B 7/68* (2013.01); *G03G 2215/00679* (2013.01)

(58) Field of Classification Search
CPC ............ B65H 9/04; B65H 2301/51212; B65H 2403/411; B65H 2404/1521; B65H 2404/1523; B65H 2404/166; B65H 2404/232; B65H 2404/242; B65H 2404/731; B65H 2404/742; B65H 2553/51; B65H 2553/83; B65H 2555/26; B65H 29/14; B65H 29/34; B65H 31/10; B65H 31/3027; B65H 31/3036; B65H 31/3045; B65H 31/3054; B65H 31/36; B65H 37/06; B65H 3/44; B65H 45/00; B65H 45/12; B65H 45/145; B65H 45/147; B65H 45/18; B65H 45/28; B65H 9/101; B65H 15/00; B65H 1/04; B65H 1/12; B65H 2301/422; B65H 2402/60; B65H 2405/332; B65H 31/02; B65H 39/11; B65H 3/126; B65H 3/48; B65H 5/025; B65H 5/026; B65H 5/062; B65H 5/36; B65H 83/02; B65H 9/163; B41J 13/0045; H04N 2201/0094
USPC .......................................................... 358/498
See application file for complete search history.

(56) References Cited

U.S. PATENT DOCUMENTS

| | | | |
|---|---|---|---|
| 3,981,459 | A | 9/1976 | Urbanek et al. |
| 5,072,492 | A | 12/1991 | Roccon et al. |
| 5,699,099 | A * | 12/1997 | Garand .................... B41J 2/315 347/115 |
| 5,816,569 | A * | 10/1998 | Hoshi .................. B65H 3/5261 271/117 |
| 5,884,135 | A | 3/1999 | Moore |
| 6,015,143 | A * | 1/2000 | Jimenez .................. B65H 1/00 271/145 |
| 6,480,298 | B1 | 11/2002 | Sullivan |
| 7,134,388 | B2 | 11/2006 | Suzuki et al. |
| 7,182,192 | B2 * | 2/2007 | Murrell .................... F16D 41/06 192/38 |
| 7,324,779 | B2 | 1/2008 | Anderson et al. |
| 2003/0030711 | A1 | 2/2003 | Marsh et al. |
| 2003/0089249 | A1 * | 5/2003 | Suzuki ...................... D21G 1/00 100/169 |
| 2004/0216624 | A1 | 11/2004 | Matuschczyk et al. |
| 2006/0205580 | A1 * | 9/2006 | Sekine .................. B65H 45/18 493/421 |
| 2007/0231033 | A1 * | 10/2007 | Okazaki ................ B65H 5/062 399/388 |
| 2010/0009830 | A1 * | 1/2010 | Dobashi .................. B65H 45/18 493/454 |
| 2011/0068535 | A1 * | 3/2011 | Amamoto .............. B65H 43/08 271/279 |
| 2011/0140348 | A1 * | 6/2011 | Urano ................ B65H 29/6609 271/207 |
| 2011/0212817 | A1 * | 9/2011 | Imazu .................. B65H 45/148 493/442 |
| 2011/0221115 | A1 * | 9/2011 | Fukatsu ................ B65H 45/18 270/32 |
| 2014/0005022 | A1 * | 1/2014 | Iida ........................ B65H 45/00 493/405 |
| 2014/0023418 | A1 * | 1/2014 | Kashiwagi ......... G03G 15/6541 399/410 |
| 2015/0021844 | A1 * | 1/2015 | Kubo ...................... B65H 43/00 270/1.01 |
| 2015/0063847 | A1 * | 3/2015 | Yokomizo ............ G03G 15/205 399/45 |
| 2018/0164732 | A1 * | 6/2018 | Ge ...................... G03G 15/6573 |
| 2019/0121275 | A1 * | 4/2019 | Akiyama ............ G03G 15/6529 |
| 2019/0161300 | A1 * | 5/2019 | Katto ................ G03G 15/6529 |
| 2019/0177100 | A1 * | 6/2019 | Kuo ...................... B65H 7/20 |
| 2019/0306352 | A1 * | 10/2019 | Miwa ................. H04N 1/00602 |
| 2019/0367304 | A1 * | 12/2019 | Akagawa ........... G03G 15/6555 |
| 2019/0389680 | A1 * | 12/2019 | Miyagawa ......... H04N 1/00588 |
| 2020/0002112 | A1 * | 1/2020 | Deno ................. G03G 15/6579 |
| 2020/0007704 | A1 * | 1/2020 | Fukushima ............ B65H 5/062 |

FOREIGN PATENT DOCUMENTS

| | | |
|---|---|---|
| EP | 2028004 A2 | 2/2009 |
| JP | 2002030591 A | 1/2002 |
| WO | WO-03041960 A1 | 5/2003 |

* cited by examiner

CONDITIONER MODULES WITH CALENDER ROLLERS

BACKGROUND

Imaging devices may perform actions on or with media. Imaging devices may print, scan, copy, or perform other actions on or with the media. Imaging devices may deposit print fluid on to media. Further, imaging devices may transport media throughout the imaging device, into or out of the imaging device, or from a first imaging device to a second imaging device or other device.

DETAILED DESCRIPTION

Figure 1:
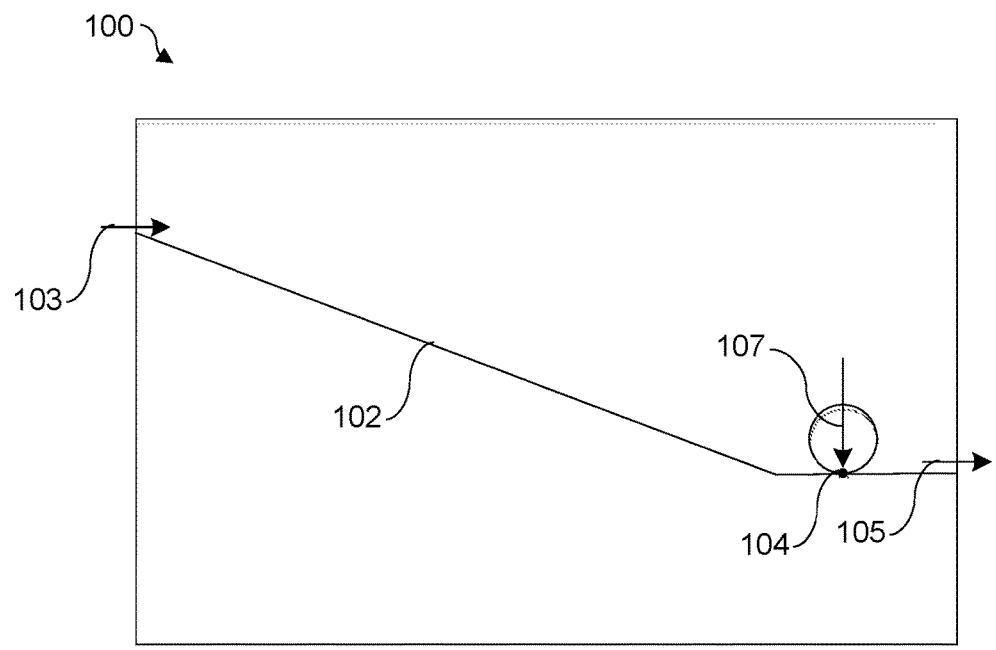
FIG. 1 is a schematic view of an example conditioner module.

Imaging devices may perform actions on or with media, or a medium thereof. Imaging devices may print, scan, copy, or perform other actions or imaging operations on or with media. Imaging devices may deposit a print substance, such as ink, on media while carrying out such imaging operations. Such print substance may be deposited on a top surface of the media in order to create or define a printed image, text, or another pattern. The print substance may increase the friction of the media, or a coefficient of friction thereof, by creating peaks and valleys from the print substance on the top surface of the media. Such increase in friction may, thereby, increase the friction present in between sheets or portions of media in a stack of media.

In some situations, imaging devices may perform an imaging operation in one portion of the imaging device, then transport media to another portion of the imaging device wherein the imaging device may perform another operation on or with the media, such as a finishing operation. Such finishing operations may include stacking, collating, organizing, reorienting, or another finishing operation performed on or with the media. The performance of such finishing operations may be inhibited or made less efficient by the imaging operation performed on the media, such as an operation that increases the friction between sheets or portions of the media in a stack of media. In some situations, the finishing operation or operations may be performed by a finisher module, which may be a separate module attached to the imaging device, or may be an integrated portion or module of the imaging device. The media may be transported from the imaging device to the finisher module by an intermediary component.

In some situations, it may be desirable to perform a conditioning operation on the media in between an imaging operation and a finishing operation. Such conditioning operations may decrease the friction of the media, or the friction in between sheets or portions of the media in a stack of media, and may include compressing, flattening, polishing, or other conditioning operations.

In some situations, certain imaging devices, such as high-speed, high-volume, or other high-performing and/or high output imaging devices may incorporate laser printing technology to achieve the output and performance desired of such an imaging device. Laser printing technology may include depositing toner on to media during an imaging operation. Toner may decrease the friction of the media, or the coefficient of friction thereof. As such, it may not be necessary to have such a high-performing imaging device perform conditioning operations on the media before performing finishing operations on the media. In further situations, it may be desirable to utilize inkjet printing technology in such a high-performing imaging device, for example, page-wide array (PWA) inkjet printing technology, instead of laser printing technology. Thus, in some situations, the finishing operations performed by such an imaging device, or a finisher module attached thereto, may suffer or be inhibited by the increase in media friction due to incorporating inkjet printing technology instead of laser printing technology in such an imaging device.

Implementations of the present disclosure provide conditioner modules that perform conditioning operations on or with media after the media has had an imaging operation performed on or with it. Such conditioning operations may decrease the coefficient of friction of the media, or the friction between sheets or portions of stacked media, thereby preparing the media such that it may be easier and/or more efficient to perform finishing operations on or with the media after such a conditioning operation. Implementations of conditioning modules disclosed herein may be utilized in high-performing imaging devices, in some implementations, such that inkjet technology may be used in such an imaging device, with no decrease in finisher module performance due to increase friction of the media from the inkjet operations.

Referring now to FIG. 1, a schematic view of an example conditioner module 100 is illustrated. The conditioner module 100 may include a bridge 102 to receive 103 media from a media path of an imaging device, or a media output thereof, and to deliver 105 the media to a media input of a finisher module. The conditioner module 100 may further include a calender nip 104 disposed at an output end of the bridge 102. The calender nip 104 may compress and/or flatten the media and may feed or deliver 105 the media into the media input of the finisher module. In some implementations, the calender nip 104 may exert a squeezing or compressing force in a direction 107, which, in some implementations, may be orthogonal, normal, and/or lateral to a feed direction of a media path extending along the bridge 102.

The bridge 102 may include a bridge media path, sometimes referred to as a conditioner media path, to operably engage with the media path of the imaging device and the media input of the finisher module. Thus, media may be delivered along the media path of the imaging device, followed by the bridge media path, and into the media input of the finisher module. In further implementations, the bridge may include sufficient structure, for example frames, rollers, housings, or other structures, to support such a bridge media path. It should be noted that, although illustrated as extending in a substantially downward direction across the conditioner module 100, the bridge 102, and thus the bridge media path thereof, may also extend in a variety of directions or orientations other than downward, in some implementations.

The calender nip 104 may be a location, structure, or feature of the conditioner module 100 that may press on, or apply pressure to, media as the media is delivered past or through the calender nip 104. The calender nip 104 may be different from other nips or rollers of the conditioner module 100, or an imaging device within which the conditioner module 100 may be disposed or attached to, in that the calender nip 104 may deform the media, either elastically or plastically, such that the media is better suited to be manipulated by a finisher module. In some implementations, the calender nip 104 may compress the media. Compress may refer to the action of decreasing the thickness of the media as it passes through the calender nip 104. Further, the calender nip 104 may flatten the media, which may refer to the action of reducing waviness or other planar distortion across the length and/or width of the media, or, in other words, to increase the smoothness or flatness of the media. Compressing and/or flattening the media may eliminate or attenuate peaks and valleys of print substance deposited on the media from imaging operations performed on the media. In other words, the peaks and valleys of the media resulting from an imaging operation may be reduced such that the media may move over surfaces and other sheets of media in an easier, smoother, faster, or more efficient manner. Thus, compressing and/or flattening the media may have the effect of decreasing a frictional aspect of the media, such as a coefficient of friction of the media, or friction that may be present in between sheets of stacked media. In yet further implementations, the calender nip 104 may polish the media, or, in other words, may make a surface of the media more uniform, smoother, and/or improve the sheen, glare, or appearance of the media, as the media moves through the calender nip 104. Thus, the media, after compression, polishing, and/or flattening, may be better suited for stacking, collating, stapling, reorienting, or other finishing operations. For example, more sheets of media may be able to be stacked and stapled by a finisher module after the media sheets have been delivered through the calender nip 104 than if the media had not been delivered through the calender nip 104.

Figure 2:
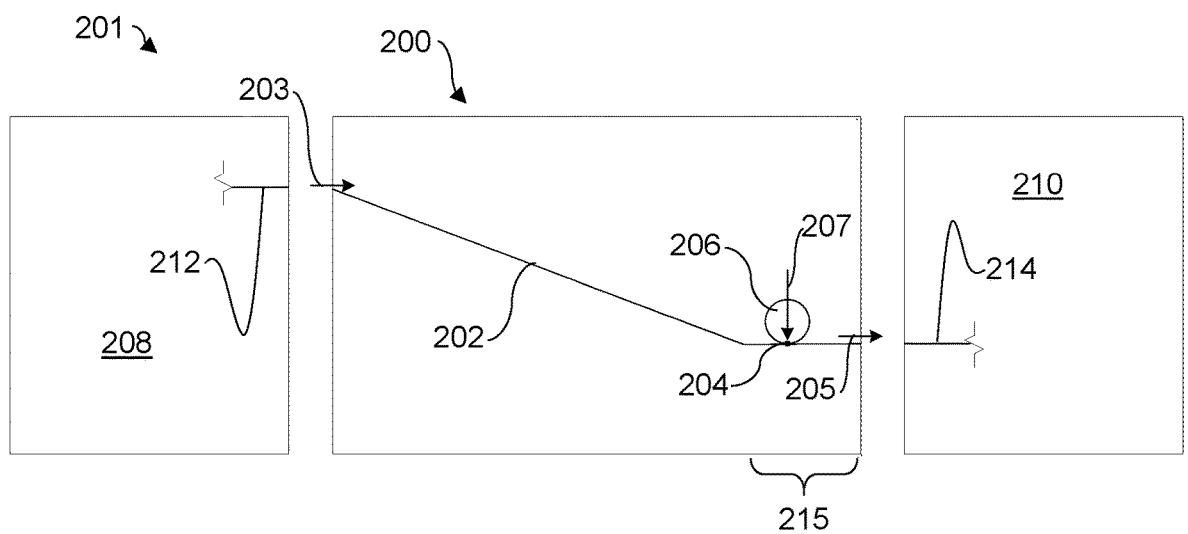
FIG. 2 is a schematic view of an example imaging device having an example conditioner module.

Referring now to FIG. 2, a schematic view of an example imaging device 201 having an example conditioner module 200 is illustrated. Example conditioner module 200 may be similar to example conditioner module 100. Further, the similarly-named elements of example conditioner module 200 may be similar in function and/or structure to the respective elements of example conditioner module 100, as they are described above. In some implementations, the imaging device 201 may further include an imaging portion 208 and a finisher module 210, which may both be operably engaged with the example conditioner module 200. Although illustrated as separate components, in some implementations, the conditioner module 200, the finisher module 210, and the imaging portion 208, some or all, may be part of a single imaging device, such as a printer, copier, or multifunction device. In other implementations, the finisher module 210 may be a separate device from the imaging device 201, and may be connected to, or assembled on to the imaging device when finishing operations are desired.

In the illustrated example, media such as print media may be delivered along a media path of the imaging portion 208. The media may have imaging operations performed on or with the media throughout the media movement along the media path of the imaging portion. The media may be received by a conditioner media path of the conditioner module 200 from a media output 212 of the media path of the imaging portion 208. The conditioner media path may be a path disposed on a bridge 202, suitably sized and structured to move media through the conditioner module 200. After being received from the media output 212, the media may be delivered or otherwise moved along the bridge 202 of the conditioner module 200 to an output end 215 of the conditioner module 200. The output end 215 may refer to a portion of the conditioner module 200 having a media output, or, in other words, where media may exit the conditioner module 200. Note, in other implementations, the output end 215 may have a different location or orientation than as illustrated in FIG. 2.

The conditioner module 200 may include a calender nip 204 disposed along the conditioner media path at the media output of the conditioner module 200. In some implementations, the calender nip 204 may include a calender roller 206, which, in further implementations, may include a one-way clutch. The calender roller 206 may be a roller, wheel, bearing, or another member that may be driven along a longitudinal and/or rotational axis to rotate in a direction of media movement along the conditioner media path. The calender nip 204, or the calender roller 206 thereof, may compress and/or flatten the media as it is delivered or otherwise moved through the calender nip 204, such that a stacking friction of the media is decreased. In further implementations, the calender nip 204 may also be a media moving nip and may feed the media into the finisher module 210 after the media has been compressed and/or flattened. In other implementations, the calender nip 204 may also polish the media as it is moved through the calender nip 204. After the media has gone through the calender nip 204, the media may be fed or delivered out of the output end 215 of the conditioner module 200, and into a media input 214 of the finisher module 210.

Figure 3A:
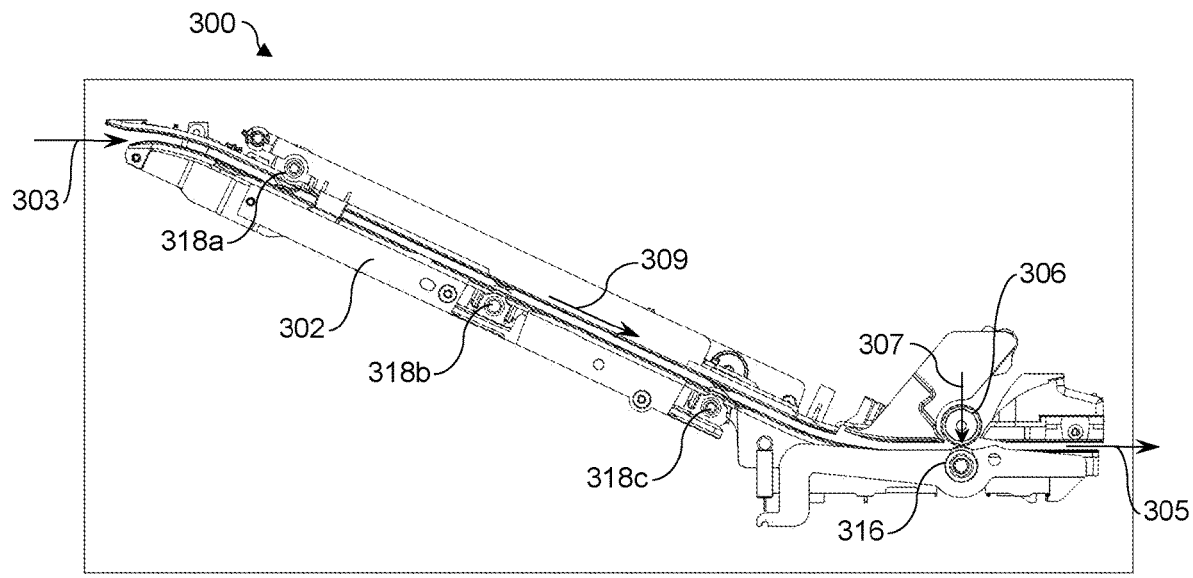
FIG. 3A is a side view of an example conditioner module.

Referring now to FIG. 3A, a side view of an example conditioner module 300 is illustrated. Example conditioner module 300 may be similar to other example conditioner modules described above. Further, the similarly-named elements of example conditioner module 300 may be similar in function and/or structure to the respective elements of other example conditioner modules, as they are described above. In some implementations, the conditioner module 300 may receive 303 media at a media input of the conditioner module 300, or a bridge 302 thereof, and deliver 309 the media along a conditioner media path to an output end of the conditioner module 300. In some implementations, the conditioner module 300, or the bridge 302 thereof, may include a plurality of media moving nips and/or rollers (for example, nips and/or rollers 318a, 318b, and 318c) to move the media along the bridge 302, or the conditioner media path thereon, to the output end. In some implementations, the conditioner module 300, or the bridge 302 thereof, may include more or fewer media moving nips and/or rollers than is illustrated. The conditioner module 300 may include a calender nip disposed at the output end. The calender nip, in some implementations, may include a calender roller 306 to exert a pressure on the media, for example along direction 307, as the media is delivered through the calender nip in order to compress, flatten, and/or polish the media. In the illustrated implementation, the calender nip may include a second calender roller 316, and the calender roller 306 may be referred to as a first calender roller 306.

Figure 3B:
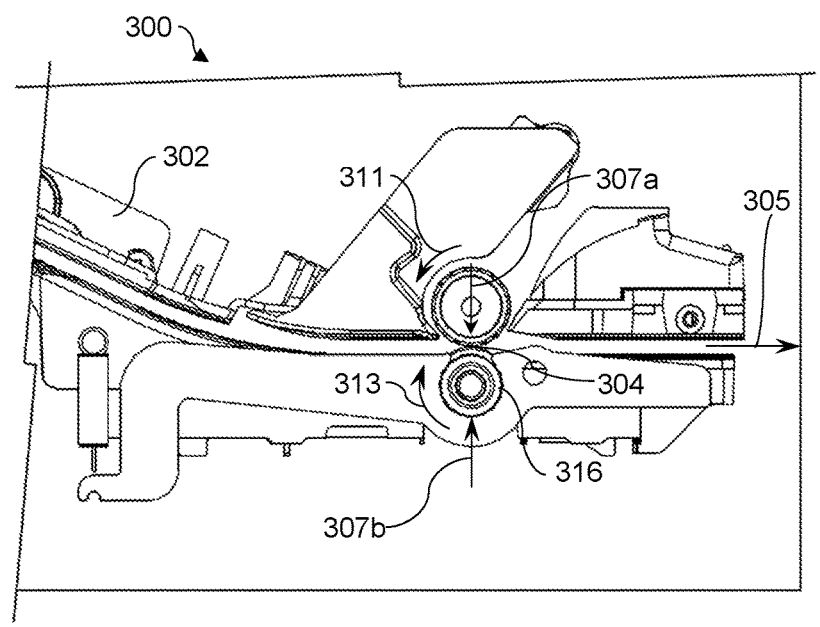
FIG. 3B is a detail view of an example conditioner module.

Referring additionally to FIG. 3B, a detail view of the example conditioner module 300 is illustrated. Specifically, a detail view of the output end of the conditioner module 300 is illustrated. The first calender roller 306 and the second calender roller 316 may be disposed at the output end of the conditioner module 300, or the bridge thereof. The first calender roller 306 and the second calender roller 316 may be similar in function and/or structure to the calender roller 206, described above. In some implementations, the first calender roller 306 and the second calender roller 316 may rotate towards each other in order to both rotate in the direction of media movement along the conditioner media path. In further implementations, the first calender roller 306 may rotate or be driven in example direction 311, while the second calender roller 316 may rotate or be driven in example direction 313. In some implementations, direction 311 may be referred to as a forward direction of the first calender roller 306, and direction 313 may be referred to as a forward direction of the second calender roller 316. In some implementations, one of the first calender roller 306 and the second calender roller 316, or both, may be a media moving roller, or, in other words, may be rotated so as to advance media along the conditioner media path.

The first calender roller 306 and the second calender roller 316 may be arranged, oriented, and/or structured to define a calender nip 304, which may be disposed in between the first and second calender rollers 306, 316. In further implementations, the first calender roller 306 and the second calender roller 316 may be radially pressed against one another along their longitudinal length to define the calender nip 304 at the point of contact in between the rollers. In other words, the first calender roller 306 may be pressed against the second calender roller 316, for example along direction 307a, to define the calender nip 304. Alternatively, the second calender roller 316 may be pressed against the first calender roller 306, for example along direction 307b, to define the calender nip 304. In yet further implementations, both the first and second calender rollers 306, 316 may be pressed against the other in order to define the calender nip 304.

Upon being delivered through the conditioner module 300 to the output end, media may be delivered or moved through the calender nip 304. The calender nip 304 may compress and/or flatten the media as the media is fed through the calender nip 304, and, in further implementations, the calender nip 304 may also polish the media. The calender nip 304 may also feed 305 the media into a media input of a finisher module (located downstream from the conditioner module 300) after the media has been compressed, flattened, and/or polished.

In some implementations, one of the first calender roller 306 and the second calender roller 316 may include a one-way clutch to enable the respective first calender roller 306 or second calender roller 316 to rotate in a forward direction, and to prevent the respective first calender roller 306 or second calender roller 316 from rotating in a backward direction, opposite to the forward direction. In other words, either the first calender roller 306 or the second calender roller 316 may include a one-way clutch to allow that roller to rotate only in the respective forward direction in the direction of media movement, and may be prevented from rotating in a direction against media movement. In implementations wherein the conditioner module only includes a single calender roller defining the calender nip, the single calender roller may include the one-way clutch. The one-way clutch may be any mechanism that enables a roller to rotate in a single direction. In further implementations, the one-way clutch may enable the roller to be overdriven in the respective roller's forward direction. Stated differently, the one-way clutch may enable the calender roller to which it is operably engaged to rotate in the roller's forward direction at a higher angular speed or rotational speed than the calender roller is driven by the conditioner module. In yet further implementations, the finisher module may pull media from the output end of the conditioner module 300 into the media input of the finisher module such that the media itself overdrives the calender roller.

Figure 4:
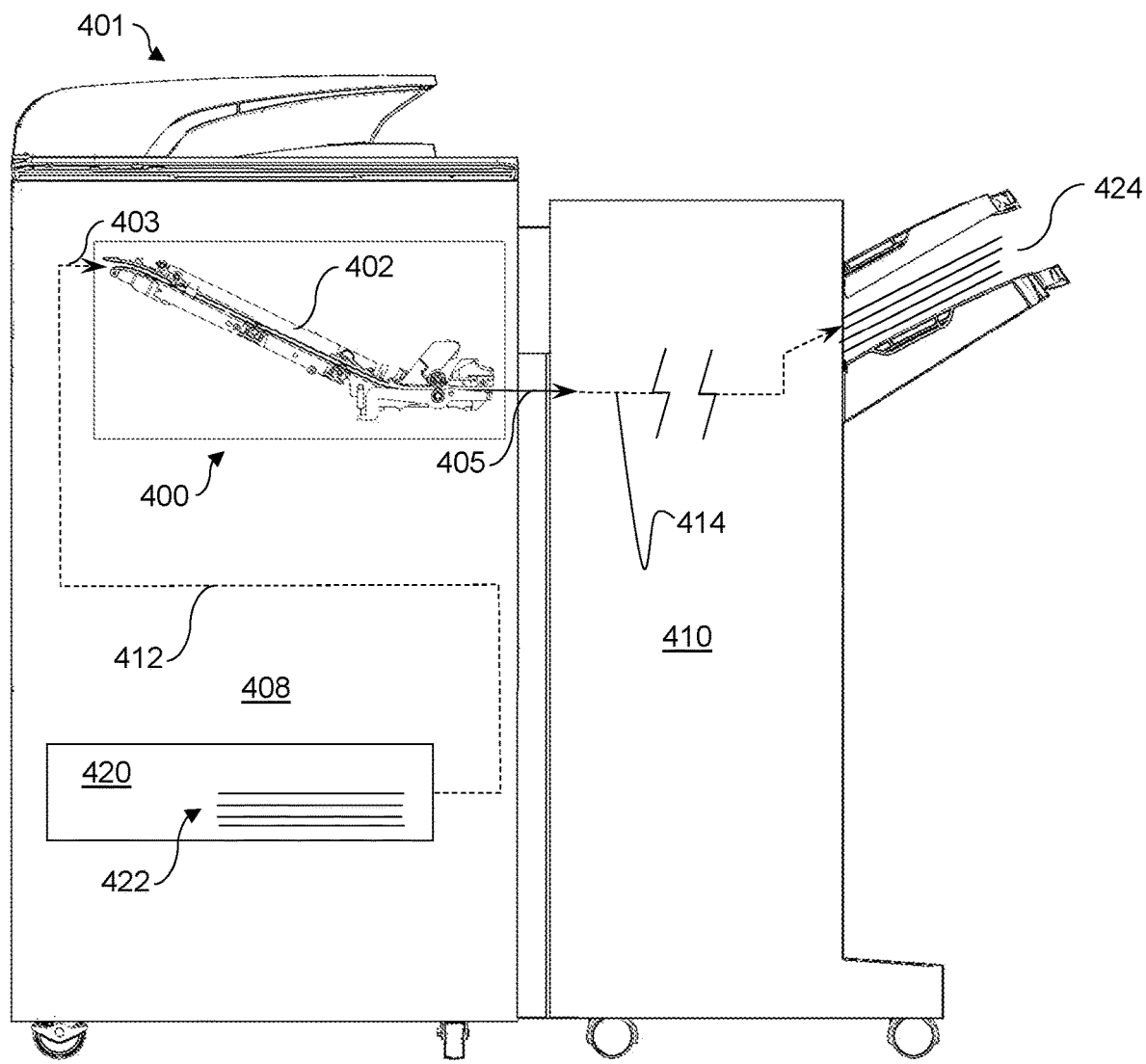
FIG. 4 is a side view of an example imaging device having an example conditioner module.

Referring now to FIG. 4, a side view of an example imaging device 401 including an example conditioner module 400 is illustrated. Example conditioner module 400 may be similar to other example conditioner modules described above. Further, the similarly-named elements of example conditioner module 400 may be similar in function and/or structure to the respective elements of other example conditioner modules, as they are described above. In some implementations, the imaging device 401 may also include an imaging portion 408 and a finisher module 410. The imaging portion 408 may perform imaging operations on or with media. Such imaging operations may include printing, scanning, copying, or other imaging operations. In some implementations, the imaging portion 408 may use inkjet technology or PWA inkjet technology to deposit print fluid, such as ink, on to the media. The media may be loaded into and disposed in a media storage portion 420, such as a media tray or drawer. In some implementations, the media may be disposed in a media stack 422 or ream within the media storage portion 420. The media may be paper, cardboard, card stock, vinyl, latex, or another type of material suitable for use in the imaging device 401.

The imaging device 401 may include an imaging device media path 412, along which media may be delivered through the imaging device. The media may have imaging operations performed on or with the media while the media is delivered along the imaging device media path 412. The imaging device media path 412 may then deliver the media, after undergoing the imaging operation(s), to a media input of the conditioner module 400. It should be noted that other implementations of the example imaging device 401 may have a media path with a differing layout than is illustrated. The conditioner module 400 may receive 403 the media from the imaging device media path 412 and deliver the media along a bridge 402, or a conditioner media path thereon, to perform conditioning operations on or with the media. Such conditioning operations may include compressing, flattening, and/or polishing the media in order to decrease the friction of the media, which may have been previously increased during the imaging operation. In some implementations, the conditioner media path may be integrated with the imaging device media path 412 such that they collectively may be referred to as the media path. The conditioner module 400 may then deliver 405 the media, after it has been conditioned, to a finisher module 410, or a media input thereof. Stated differently, the bridge 402, disposed along the media path, may connect the media path to the media input of the finisher module 410 and deliver the media to the finisher module 410. The finisher module 400 may include a finisher media path 414 (shown abbreviated) along which the media may be delivered in order to have finishing operations performed on or with the media. Such finishing operations may include stacking, collating, stapling, reorienting, or other finishing operations. In some implementations, the media may be delivered to an output tray and disposed in an output stack 424.

In some implementations, the imaging device may be a copier to scan and produce duplicates of documents, and the imaging device media path may be referred to as a copier media path. In some situations, the imaging portion 408 of the imaging device 401 may be the copier. In yet further implementations, the imaging device may use inkjet printing technology to produce duplicates of the scanned documents. In some implementations, the conditioner module 400 may condition the duplicate documents such that they are able to undergo finishing operations in an easier, more effective, or more efficient manner.

What is claimed is:

1. A conditioner module for an imaging device, comprising:
   a bridge to receive media from a media path of the imaging device and to deliver the media to a media input of a finisher module for the imaging device; and
   a calender nip disposed at an output end of the bridge, the calender nip including a calender roller having a one-way clutch,
   the calender nip to compress the media and to feed the media into the media input of the finisher module, and the media input of the finisher module to pull the media and overdrive the one-way clutch of the calender roller.

2. The conditioner module of claim 1, wherein the calender nip is to polish the media as the media is moved through the calender nip.

3. The conditioner module of claim 1, wherein the one-way clutch is to enable the calender roller to rotate only in a forward direction.

4. The conditioner module of claim 3, wherein the one-way clutch is to enable the calender roller to be overdriven in the forward direction.

5. The conditioner module of claim 1, wherein the bridge comprises a plurality of media moving nips to deliver the media along the bridge to the output end.

6. The conditioner module of claim 1, wherein the calender roller comprises a first calender roller, and the calender nip further includes a second calender roller, wherein the calender nip is defined at a point of contact between the first calender roller and the second calender roller.

7. The conditioner module of claim 1, wherein the calender nip is to compress and flatten the media as the media is moved through the calender nip.

8. A conditioner module for an imaging device, comprising:
   a conditioner media path to receive media from a copier media path; and
   a calender nip disposed at a media output of the conditioner module, the calender nip including a calender roller having a one-way clutch,
   the calender nip to compress and flatten the media as the media is moved through the calender nip such that stacking friction of the media is decreased, and to feed the media into a finisher module for the imaging device after the media has been compressed and flattened, the finisher module to pull the media from the media output of the conditioner module such that the media overdrives the one-way clutch of the calender roller.

9. The conditioner module of claim 8, wherein the calender roller comprises a first calender roller, and the calender nip further includes a second calender roller, wherein the calender nip is defined at a point of contact between the first calender roller and the second calender roller.

10. The conditioner module of claim 8, wherein the calender nip is to polish the media as the media is moved through the calender nip.

11. The conditioner module of claim 8, wherein the one-way clutch is to enable the calender roller to rotate in a forward direction at a higher angular speed than the calender roller is driven by the conditioner module.

12. An imaging device, comprising:
   a copier;
   a media path within the copier;
   a finisher module; and
   a conditioner module, comprising:
      a bridge disposed along the media path to connect the media path to a media input of the finisher module; and
      a first calender roller and a second calender roller disposed at an output end of the bridge, the first calender roller and the second calender roller arranged to define a calender nip, and one of the first calender roller and the second calender roller including a one-way clutch, the calender nip to compress and flatten the media and to feed the media into the media input of the finisher module after the media has been compressed and flattened, and the media input of the finisher module to pull the media from the output end of the bridge and overdrive the one-way clutch.

13. The imaging device of claim 12, wherein the first calender roller and the second calender roller are radially pressed against one another to define the calender nip.

14. The imaging device of claim 13, wherein the calender nip is to polish the media as the media is delivered through the calender nip.

15. The imaging device of claim 14, wherein the one-way clutch is to enable the respective first calender roller or second calender roller to rotate in a forward direction, and to prevent the respective first calender roller or second calender roller from rotating in a backward direction.

* * * * *